(12) United States Patent
Kompella et al.

(10) Patent No.: US 7,747,716 B2
(45) Date of Patent: Jun. 29, 2010

(54) INJECTING ADDRESSES TO ENABLE OAM FUNCTIONS

(75) Inventors: Vach Kompella, Cupertino, CA (US); Joe Regan, Pleasanton, CA (US); Wenao Hu, San Jose, CA (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1888 days.

(21) Appl. No.: 10/742,239

(22) Filed: Dec. 18, 2003

(65) Prior Publication Data

US 2004/0215758 A1    Oct. 28, 2004

Related U.S. Application Data

(60) Provisional application No. 60/466,322, filed on Apr. 28, 2003.

(51) Int. Cl.
 G06F 15/177 (2006.01)
 G06F 15/173 (2006.01)
 H04L 12/26 (2006.01)

(52) U.S. Cl. .................. 709/223; 709/220; 709/221; 709/242; 370/241.1

(58) Field of Classification Search .............. 709/205, 709/238–242, 220–228; 370/241, 241.1, 370/351
See application file for complete search history.

(56) References Cited

U.S. PATENT DOCUMENTS

| 7,164,665 | B2 * | 1/2007 | Tourunen | 370/329 |
| 2002/0199016 | A1 * | 12/2002 | Freedman | 709/241 |
| 2003/0204619 | A1 * | 10/2003 | Bays | 709/238 |
| 2003/0208616 | A1 * | 11/2003 | Laing et al. | 709/236 |
| 2004/0090921 | A1 * | 5/2004 | Russell Bennett | 370/241 |

* cited by examiner

Primary Examiner—Nathan Flynn
Assistant Examiner—Joshua Joo
(74) Attorney, Agent, or Firm—Van Pelt, Yi & James, LLP (57) ABSTRACT

Inserting an address used for performing such OAM functions in an efficient way that is transparent to a customer or service using the network path is disclosed. An indication is received that a source address reserved for OAM use should be inserted into a forwarding database associated with a provider network node, such as a provider edge device, that receives the indication. The address is inserted into a forwarding database as an address that is owned by the provider network node and reserved for OAM use. One or more other nodes associated with a service with which the OAM address is associated may be notified that the OAM address is associated with the provider network node that owns the OAM address.

35 Claims, 5 Drawing Sheets

INJECTING ADDRESSES TO ENABLE OAM FUNCTIONS

CROSS REFERENCE TO RELATED APPLICATIONS

This application claims priority to U.S. Provisional Patent Application No. 60/466,322 entitled "Injecting Addresses into a Virtual Private Network Forwarding Database to Enable Operational, Administrative, and Management Functions" filed Apr. 28, 2003 which is incorporated herein by reference for all purposes.

FIELD OF THE INVENTION

The present invention relates generally to computer networks. More specifically, injecting addresses to enable operational, administrative, and management functions is disclosed.

BACKGROUND OF THE INVENTION

In data communications, diagnosing a network service associated with a specific customer is useful in ensuring that desired quality of service (QoS), continuity, and connectivity, among other factors are maintained. The customer's network or set of networks may be connected over a network topology that includes one or more service provider or backbone networks. Network topologies for implementing these services may include virtual private networks (VPNs), virtual private LAN services (VPLS), transparent LAN services (TLS), hierarchical virtual private LAN services (HVPLS), virtual private routing networks (VPRN), or other bridged or routed services. Continuity is defined as the continuous ability to send packets correctly through a service. Connectivity is defined as the actual parameters, control plane information, and forwarding plane information used to implement a service. Testing a network service may comprise performing operational, administrative, and management (OAM) functions, such as ensuring that a VPN, VPLS, TLS, VPRN or other bridged or routed service provides quality service to a customer.

OAM functionality depends on the installation of customer addresses in the forwarding plane of a network topology (e.g., mesh, TLS, VPLS, etc.). However, the installation of customer addresses using conventional techniques may be inefficient and time consuming. In addition, installation of customer addresses for OAM purposes using conventional techniques may not be transparent to the customer whose service is being tested and could affect the service provided adversely.

Thus, what is required is a solution for diagnosing a network service or topology for various OAM extended functions without adversely impacting the service itself.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a non-transitory computer readable storage medium. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Using OAM functions, the continuity and connectivity over a network path may be tested. Inserting an address used for performing such OAM functions in an efficient way that is transparent to a customer or service using the network path is disclosed.

Figure 1:
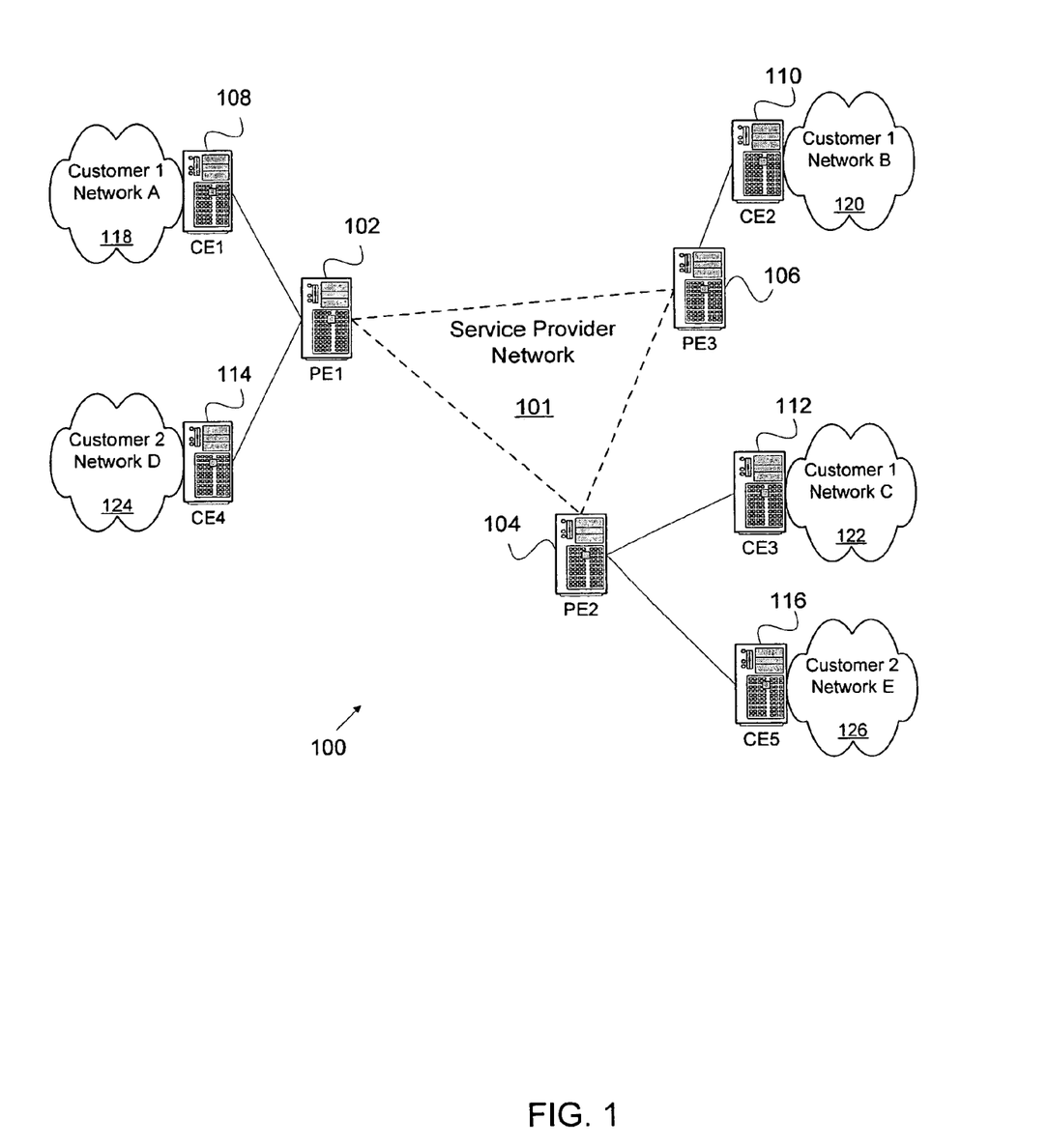
FIG. 1 illustrates a network service with respect to which OAM functions may be required to be performed.

FIG. 1 illustrates a network service with respect to which OAM functions may be required to be performed. In this embodiment, system 100 includes a service provider network 101 having provider edge (PE) routers 102, 104, and 106. In other embodiments additional or fewer PEs may be included. Here, PEs 102-106 provide edge routing for packets over service provider network 101. PEs 102-106 also route packets over service provider network 101 to destinations/nodes associated with customer edge (CE) routers CE1-5 within customer 1 and 2 networks 118-126 that are in data communication with the edge routers. In this embodiment, customer 1 has three disparate networks A, B and C (118, 120, and 122, respectively) that are connected over a network topology (e.g., VPN mesh of tunnels, VPLS, etc.) and customer 2 has two disparate networks D and E (124 and 126, respectively) connected across service provider network 101. Various network topologies may be used and the techniques disclosed herein are not limited to a specific topology. In the example shown in FIG. 1, a full mesh of label switched path (LSP) tunnels has been established to enable PE1, PE2, and PE3 to transport traffic through service provider network 101, such as may be used to provide a VPLS or similar service. In other embodiments, other protocols and transport technologies may be used.

Customer edge (CE) routers CE1-3 108-112 route packets between customer 1 networks 118-122 via PEs 102-106, respectively, which serve as ingress and egress points to the service provider network 101 for customer 1's data traffic. Likewise, CEs 114-116 route data traffic between customer 2 networks 124 and 126 via PEs 102 and 104, respectively. In an embodiment, service provider network 101 may be a backbone network used to route data between customer networks that may be Ethernet based LANs connected in a distributed manner. In other embodiments, service provider network 101 may have fewer or more provider and customer edge routers than those shown in FIG. 1.

As noted above, to perform OAM functions test packets may be created, injected, and routed over service provider network 101 to determine continuity, connectivity, and other characteristics of services for customer 1 and customer 2. In order to enable such OAM functions to be performed in an efficient way that is transparent to the customer, addresses reserved for OAM use are injected into the forwarding database of one or more of the nodes on the provider network associated with a particular customer or service, e.g., PEs 102-106 in the case of Customer 1 or PEs 102 and 104 in the case of Customer 2 in the example shown in FIG. 1.

For example, in a VPLS embodiment an Ethernet frame in customer 1 network 118 may be encapsulated for forwarding to customer 1 network 120 over a VPLS on service provider network 101. The encapsulated data is not modified or altered while transiting the VPLS between the customer 1 networks 118 and 120. In the case of such normal customer frames, tunnel and virtual circuit labels in an encapsulation header tell routers within service provider network 101 how to forward the packet. The customer packet includes a customer packet header comprising source and destination addresses associated with the packet such as the MAC address of the customer equipment that originated the packet. Source MAC addresses are learned by PEs 102-106, thus identifying return paths or tunnels for sending response packets. At a PE receiving a customer packet, the source MAC address is learned by storing in a forwarding database information associating the source MAC address with the ingress PE that sent the packet to the receiving PE. The PE that sent the packet (the ingress PE) also must learn an association between the source MAC address and the port and/or service with which it is associated, so that the ingress PE will know how to route packets sent to it for delivery to that address. In the case of both destination (egress) and ingress PEs, the learned address is associated as well with the service identified by one or more labels included in the encapsulation header used to transport the packet over the provider network. The techniques described herein enable an address reserved for OAM use, such as a MAC address, to be inserted into a PE forwarding database, i.e., to cause it to be learned by the ingress PE that "owns" it and the other PEs participating in the service to be tested, without requiring that the customer actually send a packet using that address.

In one approach, an address reserved for OAM use may be inserted into a forwarding database by sending to the provider network node (e.g., PE) with which the address is to be associated an OAM or other test message comprising data indicating to the node that the address should be inserted into its forwarding database. For example, one or more type-length-value (TLV) units may be added to a message sent, e.g., under an OAM or other testing protocol associated with the protocol being used to provide the service to be tested to cause an address reserved for OAM use to be added to a forwarding database. For example, Internet Engineering Task Force (IETF) Draft Proposal draft-stokes-vkompella-ppvpn-oam-2.txt and subsequent versions thereof (hereinafter the "stokes-vkompella draft") propose standards for performing OAM functions with respect to a virtual private network service such as VPLS. The stokes-vkompella draft prescribes an extensible format for test messages that allows service providers to define and include additional TLVs in OAM messages. Other protocols may similarly provide ways to include provider-specific information in test messages. Such additional TLVs (or other header or data fields) may be used, as described more fully below, to cause an address reserved for OAM use to be inserted into a forwarding database. Use of such an extension to an existing OAM protocol can provide an efficient way to insert an address reserved for OAM use into a forwarding database, as messages sent under such protocols include data identifying the service with which the address is associated, which data can be used by the receiving node, e.g., to inform all other nodes participating in the service of the newly inserted address, its nature (e.g., reserved for OAM use), and its association with the node and/or a path back to the node that "owns" it. The use of existing ways of communicating information among nodes participating in a service makes it possible to populate the forwarding databases of the nodes participating in a service with an address reserved for OAM use without requiring that an operator or OAM system determine which nodes are participating in a service and then send a separate indication to each regarding the address.

Figure 2A:
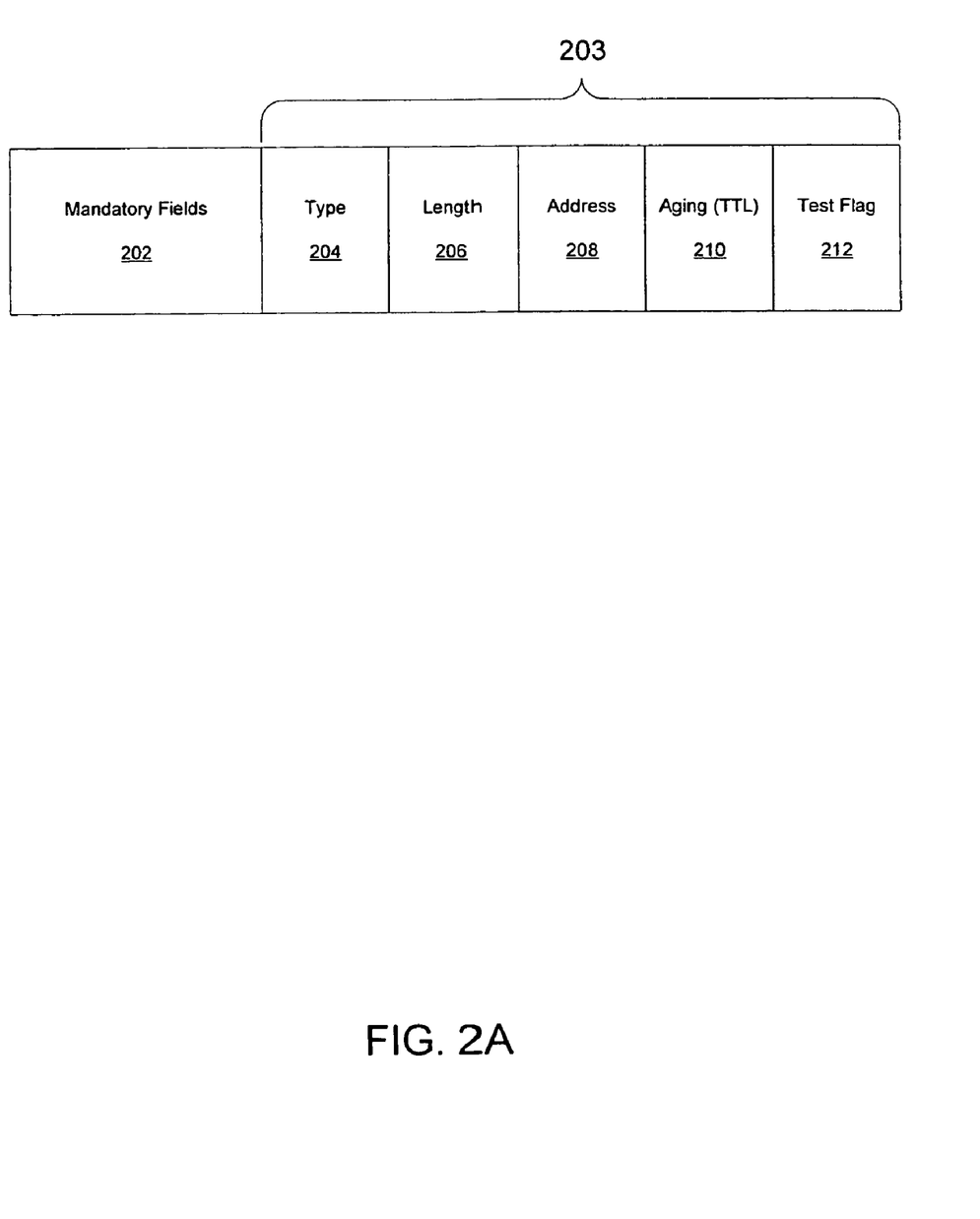
FIG. 2A illustrates a packet format used in some embodiments to insert an address reserved for OAM use into a forwarding database.

FIG. 2A illustrates a packet format used in some embodiments to insert an address reserved for OAM use into a forwarding database. In some embodiments, the test packet may include additional or fewer fields than the number shown in FIG. 2A. The test packet format shown in FIG. 2A may be used to encapsulate a data packet that is being communicated between destinations connected over a network or service (e.g., VPN, VPLS, TLS, etc.). Mandatory fields 202 represents a portion of the test packet (which may also be known as a request) used to contain data prescribed by or otherwise appropriate to a particulate protocol or set of protocols associated with the service being testing. The mandatory fields 202 may comprise data such as, in the case of a packet sent via the forwarding plane, tunnel encapsulation data, one or more virtual circuit labels, such as a label associated with the service to be tested and/or a label identifying the packet as an OAM packet, customer frame encapsulation data, an IP header, a UDP source and destination port, a common message header, and/or one or more mandatory TLVs, for example, depending on the protocol(s) used and whether the test packet is sent via the forwarding (data) plane or the control plane. In some embodiments, data comprising the mandatory fields 202 may be used to associate an address reserved for OAM use into a forwarding database with a particular service, for example, using the same (or similar) techniques and processing as occurs for MAC learning with respect to non-test (i.e., actual customer) packets transported via the service.

In the example shown in FIG. 2A, an "Address Add" TLV 203 has been added to the mandatory fields 202. Type field 204 indicates the type or purpose of the test packet. Type field 204, combined with length field 206 and value fields 208, 210, and 212 comprise a TLV that can be used to specify a particular function to be performed with respect to the test packet and/or data comprising the TLV. This will be described in greater detail below. In this example, the TLV 203 is used to insert an address reserved for OAM use into a forwarding database. Other TLVs may be defined and used for various purposes such as identifying the forwarding equivalence class (FEC) being tested, the service being tested (e.g., VPN, VPLS, VPRN, etc.), or vendor-specific OAM functions. These functions and others are described below. Length field 206 indicates the overall bit length of the TLV (described below) value (i.e., the combined length of fields 208, 210, and 212 in this example). Address field 208 provides an address value to be inserted in a forwarding database for OAM purposes. In some embodiments, a management application running, on a PE that receives the packet shown in FIG. 2A is configured to respond to the Add Address TLV, which it recognizes by the type data included in field 204, by receiving the address included in field 208 and adding that address to its forwarding database. In some embodiments, the receiving PE associates the address with a service associated with one or more labels included in the mandatory fields 202. In some embodiments, if the receiving PE is the ingress PE that is to "own" the address, the PE associates the address with the port on which the test data packet of FIG. 2A was received. In some embodiments, if the receiving PE is a destination PE that received the test packet of FIG. 2A from an ingress PE associated with (i.e., the one that "owns") the address, the receiving PE associates the address with the ingress PE that owns it. Aging field 210 indicates how long the inserted address will remain in the forwarding database prior to expiration. In some embodiments, aging field 210 can be indicated as a time-to-live (TTL) value, as shown in FIG. 2A. In other embodiments, a different type of aging may be provided. Finally, flag field 212 is provided to indicate that the address is intended for test and diagnostic purposes only. Flag field 212 distinguishes the address reserved for OAM use from addresses being used by a customer, for example, so as to not interrupt customer service, QoS, data communication, normal data packet routing, etc. In another embodiment, different flags may be used to indicate other OAM functions. In still another embodiment, multiple flags may be used or stacked to direct the performance of multiple OAM functions. Such additional flags and/or other additional fields may be used to force an existing address to be relearned as an address reserved for OAM use, using the forwarding path of the packet comprising the Address Add TLV; to allow the address to be relearned with customer packets (e.g., if the customer were to start using an address originally inserted as an OAM address); and to allow customer packets to be forwarded even if they use an OAM-installed address.

Upon receipt at an egress router (e.g., egress PE from service provider network 101) of a packet sent to an address injected into the forwarding database of the egress PE as one owned by that the PE, the PE may be configured to respond in any number of potentially useful ways. For example, a management application on the PE may be configured to recognize the address as one reserved for OAM use and on that basis intercept the packet (rather than actually forwarding it, for example, to a customer network associated with the service being tested). In some embodiments, the management application may be configured to capture data about how the packet would have been handled had it been forwarded, e.g., by recording and/or reporting the port on which it would have been sent, and/or by identifying a service distribution path and/or service access point (e.g., a physical and/or logical port) with which the egress PE had associated the address. Test packets can be assessed for a variety of reasons, depending upon the TLVs included in the test packet.

The test packet of FIG. 2A provides a basic format for test packet headers for various OAM functions, directed by different types of TLVs. One type of TLV is the Target FEC Stack TLV. The Target FEC Stack TLV is used to identify a particular FEC being tested. A VPN TLV may be used to identify the service (e.g., VPN) being tested. Vendor TLVs may be used to encapsulate vendor-specific TLVs, which may be identified based on particular implementations for testing or OAM functions. The vendor implementations may be hardware, software, or a combination of both. Validation TLVs may contain a checksum or other error-checking/authentication data field to ensure the validity of a test request and response. If a validation TLV is sent in a request and handled by the responding PE, then a validation TLV should also be included in the response packet sent back to the originating PE. Checksum formats may be used to check the version, checksum type, or other error-checking function. A reply tunnel TLV may be used to specify the reply tunnel to be used. As unidirectional tunnels are established for sending traffic between two endpoints (e.g., PEs 102-106), a pair of opposing unidirectional tunnels provide full duplex data communication. The reply tunnel TLV describes the return tunnel specification. A QoS TLV may be used in a test packet/request to indicate the forwarding class that the test packet/request used for forwarding to the egress PE. The QoS TLV also indicates the forwarding class that the responder should attempt to use for sending a response. Several other TLVs may be used and are described in U.S. Provisional Patent Application No. 60/466,322 entitled "Injecting Addresses into a Virtual Private Network Forwarding Database to Enable Operational, Administrative, and Management Functions" filed Apr. 28, 2003 which is incorporated herein by reference for all purposes.

Figure 2B:
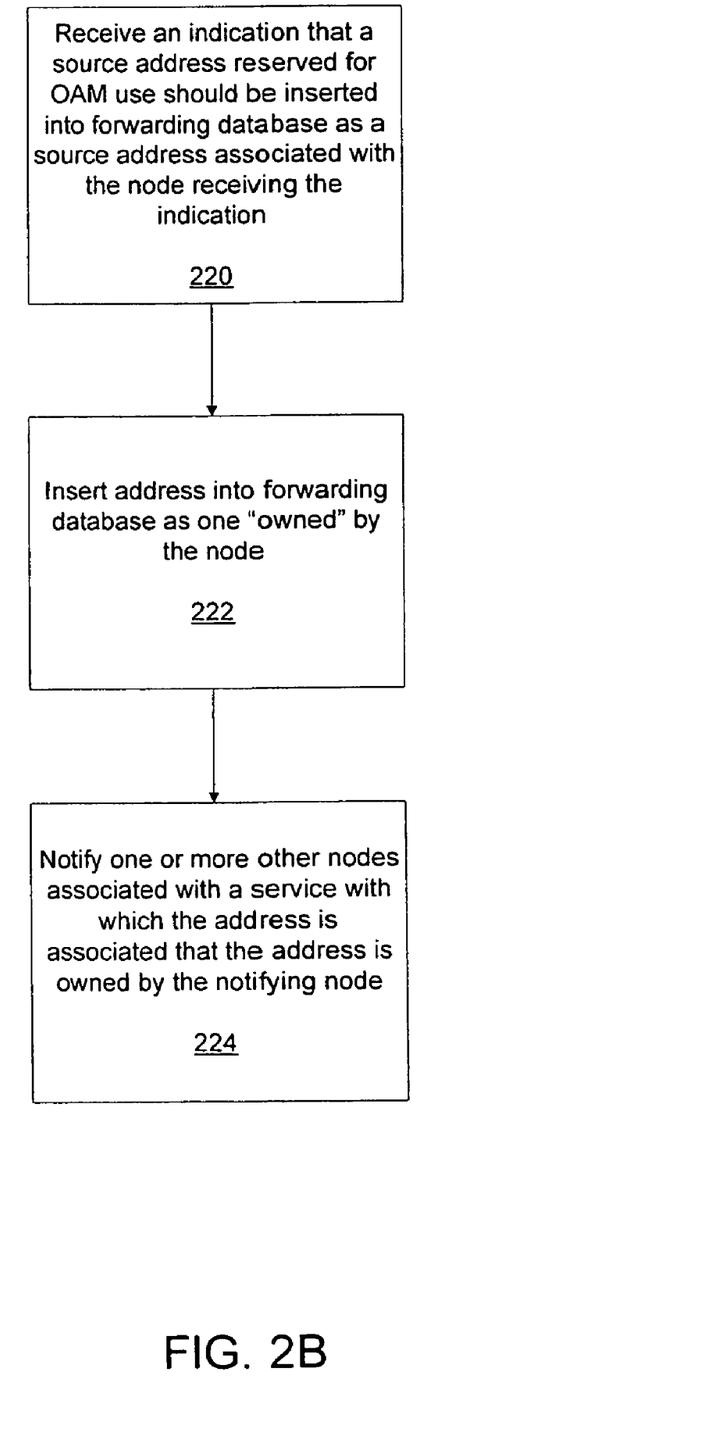
FIG. 2B illustrates a process for inserting an address reserved for OAM use into a forwarding database.

FIG. 2B illustrates a process for inserting an address reserved for OAM use into a forwarding database. In step 220, an indication is received that a source address reserved for OAM use should be inserted into a forwarding database as a source address associated with the node receiving the indication. In one embodiment, the indication is an Add Address TLV such as described above included in an OAM packet sent to the PE that is to own the OAM address. The PE may associate the OAM address with a service as indicated by data included in the OAM packet. In step 222, the PE that received the indication in step 220 inserts the OAM address into its forwarding database as one "owned" by that node (i.e., it is an address either local to or serviced by that node, e.g., one bound to a service access point at that node). In step 224, the node that received the indication in step 220 notifies one or more other nodes associated with a service with which the OAM address has been associated that the OAM address is owned by the node. In some embodiments, step 224 is performed only if the indication received in step 220 comprises a further indication that the other nodes should be notified. In some embodiments, such notification may be accomplished via either the control plane or the data plane, depending on the availability of either path and/or data included in the indication received in step 220.

Figure 2C:
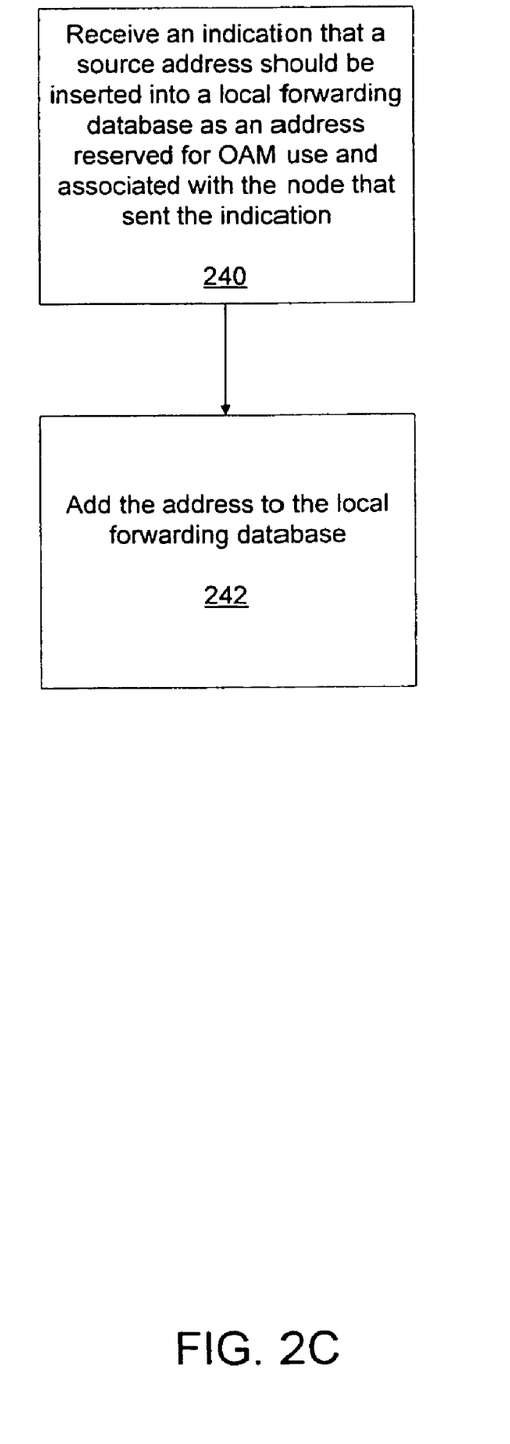
FIG. 2C illustrates a process used in one embodiment by nodes in a provider network to learn an OAM address owned by another node.

FIG. 2C illustrates a process used in one embodiment by nodes in a provider network to learn an OAM address owned by another node. In step 240, an indication is received that a source address should be inserted into a local forwarding database at the receiving node as an address reserved for OAM use that is owned by the node that originated the indication. The notification received in step 240 may be the one sent in step 224 of the process shown in FIG. 2B, for example. In step 242, the OAM address is added to a local forwarding database in such a way that it is associated with the node that originated the notification received in step 240. The OAM address may also be associated with a particular service to which the address pertains, such as by storing it in a forwarding database associated with that service.

Other OAM packets may be sent to perform other OAM functions with respect to an address inserted for OAM use. For example, OAM packets may be sent to instruct one or more nodes, e.g., all nodes associated with a particular service, to purge an OAM address from their forwarding databases.

Once inserted, addresses reserved for OAM use may be used to perform OAM functions, such as testing the continuity and/or connectivity of the VPLS or similar service, without interfering with customer operations.

Figure 3:
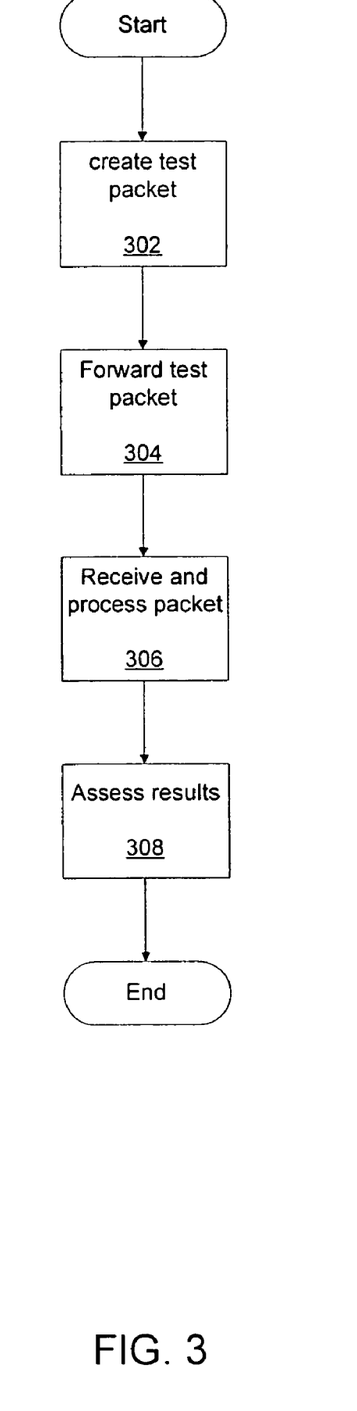
FIG. 3 illustrates a process for diagnosing a network service using an address inserted into a forwarding database for OAM use.

FIG. 3 illustrates a process for diagnosing a network service using an address inserted into a forwarding database for OAM use. A test packet is created, using header, label, and other descriptive information as required and/or appropriate under the communication protocols used to provide the service to be tested (302). The test packet, when created, may include information such as one or more TLVs for a particular OAM function such as a test or diagnostic purpose. Once created, the test packet is sent to the previously-inserted source address as though it were a customer packet received from a customer CE, and is then forwarded along a path according to the particular service being tested (304). The service (as indicated by a label associated with the packet, e.g.) may specify a particular QoS or path that a particular customer's traffic is intended to take. The test packet is forwarded along the service, mimicking characteristics of normal data traffic for the purposes of determining service characteristics such as continuity and connectivity. The test packet forwards along a path within service provider network 101, forwarded between core routers and switches until it reaches an egress PE associated with the previously-inserted OAM address.

In step 306, the test packet is received and processed by the egress PE associated with the previously-inserted OAM address. The egress PE may be configured to intercept messages sent to an OAM address and send them to a management application or utility for further processing, e.g., instead of attempting to deliver the message via an interface at the egress PE. Alternatively, the interface itself may be configured to recognize that a destination address is a previously-learned OAM address. The interface may be further configured to report to a management application or utility, e.g., how the packet would have been processed (e.g., the service with which it would have been associated and the port through which it would have been sent) had it been a customer packet. In step 308, the information generated by sending the test packet is assessed to determine the results of the test. The results may be varied and may include a number of objectives, such as determining data communication continuity, connectivity, bandwidth, or other characteristics of the particular test customer service.

In some situations, data can be sent in two different planes, a forwarding plane and a control plane. The control plane may be used to send information, generally according to the IP protocol, for establishing and/or performing OAM functions. The data plane is the forwarding path used to send customer packets associated with the service. In some embodiments, test packets can be sent in either the forwarding plane or the control plane, depending upon such factors as the nature of the test (e.g., the type of test TLV placed in the test packet) and whether the data plane is available to forward the packet.

While in certain of the embodiments described in detail above the address being inserted for OAM use is described as being a MAC address, other types of address information may be inserted into a forwarding database using the techniques disclosed herein. For example, in the case of a VPRN service, such as a VPRN as described in RFC 2547, which is a virtual private network service for transporting IP traffic, the inserted OAM address may comprise an IP address that falls within a range of internal IP address space addresses associated with a particular VPRN service. Other types of addresses similarly may be inserted to facilitate testing of other types of VPN service. Also, while in certain of the embodiments described in detail above by way of example the service with respect to which the OAM function is to be performed is a VPLS, the techniques described herein may be used in connection with any suitable network service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for inserting into a forwarding database associated with a network service an address reserved for testing use comprising:
   receiving at a first node associated with the network service a packet according to a protocol, the packet comprising the address reserved for testing use and an indication that the address reserved for testing use is to be inserted into the forwarding database for testing use;
   associating the address reserved for testing use with the network service based on information included in the packet according to the protocol;
   adding the address to the forwarding database associated with the network service; and
   using the network service to send to a second node associated with the network service an indication that the address reserved for testing use is associated with the first node with respect to the network service;
   wherein the first node is configured to intercept messages sent via the network service and addressed to the address reserved for testing use and to send said messages to a management application or utility for further processing.

2. The method as recited in claim 1 further comprising marking the address as reserved for testing use.

3. The method as recited in claim 1 further comprising receiving an indication that the address is to be associated with the first node.

4. The method as recited in claim 1 further comprising receiving an indication at the first node that one or more other nodes associated with the network service should be sent information concerning the address.

5. The method as recited in claim 1 further comprising notifying one or more other nodes associated with the network service that the address is associated with the first node.

6. The method as recited in claim 1 further comprising notifying one or more other nodes associated with the network service that the address is associated with a forwarding path associated with the first node.

7. The method as recited in claim 1 further comprising sending a second packet according to the protocol notifying one or more other nodes associated with the network service that the address is associated with the first node.

8. The method as recited in claim 1 further comprising receiving an indication that the address should be purged from the forwarding database.

9. The method as recited in claim 1 further comprising receiving an indication that the address may only be purged by a sender of the packet.

10. The method as recited in claim 1 further comprising receiving an indication that a customer packet that uses the address should be processed normally according to the protocol.

11. The method as recited in claim 1 further comprising receiving an indication that the address should be added to the forwarding database as an address reserved for testing use even if the address was previously added to the forwarding database as an address available for customer use.

12. The method as recited in claim 1 further comprising receiving according to the protocol a second packet addressed to the address reserved for testing purpose.

13. The method as recited in claim 12 further comprising associating the second packet with the address and initiating the processing of the second packet in accordance with the network service.

14. The method as recited in claim 12 further comprising providing an indication regarding the processing of the second packet.

15. The method as recited in claim 12 further comprising providing an indication of an external interface with which the second packet is associated based on the address reserved for testing use.

16. The method as recited in claim 12 further comprising sending the second packet to an interface for processing.

17. The method as recited in claim 12 further comprising determining the second packet is configured to diagnose an aspect of the network by reading a flag in the second packet.

18. The method as recited in claim 17 wherein the flag is interpreted using the protocol.

19. The method as recited in claim 12 further comprising monitoring the second packet while a customer network and a provider network are active.

20. The method as recited in claim 12 wherein the second packet is received pursuant to a test of the continuity of at least a portion of the network service.

21. The method as recited in claim 12 wherein the second packet is received pursuant to a test of the connectivity of at least a portion of the network service.

22. The method as recited in claim 1 wherein the packet according to a protocol mimics a normal packet.

23. The method as recited in claim 1 wherein the packet includes a flag indicating removal of an address.

24. The method as recited in claim 1 wherein the packet includes a flag indicating adding an address.

25. The method as recited in claim 1 further comprising receiving a query regarding the address reserved for testing use.

26. The method as recited in claim 25 further comprising providing in response to the query information associated with the address reserved for testing use.

27. The method as recited in claim 25 further comprising providing in response to the query an indication of a network node with which the address is associated.

28. The method as recited in claim 25 further comprising providing in response to the query an indication of a network path with which the address is associated.

29. The method as recited in claim 1 wherein the address reserved for testing use is a physical address.

30. The method as recited in claim 1 wherein the address reserved for testing use is a MAC address.

31. The method as recited in claim 1 wherein the indication that the address is to be inserted into the forwarding database for testing use comprises data included in a field added to the packet according to the protocol.

32. The method as recited in claim 1 wherein the indication that the address is to be inserted into the forwarding database for testing use comprises data included in a field of the packet that has been modified according to the protocol.

33. The method as recited in claim 1 wherein the indication that the address is to be inserted into the forwarding database for testing use comprises determining that a data field normally included in a packet sent according to the protocol has been removed.

34. A system inserting into a forwarding database associated with a network service an address reserved for testing use comprising:
   a processor configured to:
      receive at a first node associated with the network service a packet according to a protocol, the packet comprising the address reserved for testing use and an indication that the address reserved for testing use is to be inserted into the forwarding database for testing use;
      associate the address reserved for testing use with the network service based on information included in the packet according to the protocol;
      add the address to the forwarding database associated with the network service; and
      use, the network service to send to a second node associated with the network service an indication that the address reserved for testing use is associated with the first node with respect to the network service; and
   a memory configured to store information associated with the packet;
   wherein the first node is configured to intercept messages sent via the network service and addressed to the address reserved for testing use and to send said messages to a management application or utility for further processing.

35. A computer program product for inserting into a forwarding database associated with a network service an address reserved for testing use, the computer program product comprising a non-transitory computer readable storage medium on which are encoded computer instructions which when executed by a computer cause the computer to perform a method comprising:
   receiving at a first node associated with the network service a packet according to a protocol, the packet comprising the address reserved for testing use and an indication that the address reserved for testing use is to be inserted into the forwarding database for testing use;
   associating the address reserved for testing use with the network service based on information included in the packet according to the protocol;
   adding the address to the forwarding database associated with the network service; and
   using the network service to send to a second node associated with the network service an indication that the address reserved for testing use is associated with the first node with respect to the network service;
   wherein the first node is configured to intercept messages sent via the network service and addressed to the address reserved for testing use and to send said messages to a management application or utility for further processing.

* * * * *

UNITED STATES PATENT AND TRADEMARK OFFICE
CERTIFICATE OF CORRECTION

| | | |
|---|---|---|
| PATENT NO. | : 7,747,716 B2 | Page 1 of 1 |
| APPLICATION NO. | : 10/742239 | |
| DATED | : June 29, 2010 | |
| INVENTOR(S) | : Kompella et al. | |

It is certified that error appears in the above-identified patent and that said Letters Patent is hereby corrected as shown below:

Column 10, Claim 34, Line 21:
delete "," after use

Signed and Sealed this
Twenty-fifth Day of December, 2012

David J. Kappos
*Director of the United States Patent and Trademark Office*